US008256942B2

(12) United States Patent
Tsukamoto et al.

(10) Patent No.: US 8,256,942 B2
(45) Date of Patent: Sep. 4, 2012

(54) VEHICLE HEADLAMP

(75) Inventors: Hironori Tsukamoto, Shizouka (JP); Ryosuke Hara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 350 days.

(21) Appl. No.: 12/616,165

(22) Filed: Nov. 11, 2009

(65) Prior Publication Data

US 2010/0118558 A1    May 13, 2010

(30) Foreign Application Priority Data

Nov. 11, 2008  (JP) ................................. 2008-288880
Sep. 17, 2009  (JP) ................................. 2009-216052

(51) Int. Cl.
*F21V 7/00*    (2006.01)
*B60Q 1/18*    (2006.01)
(52) U.S. Cl. ........................................ 362/517; 362/544
(58) Field of Classification Search .................. 362/517, 362/518, 543, 544, 545, 507, 538, 539
See application file for complete search history.

(56) References Cited

U.S. PATENT DOCUMENTS

| 4,727,458 A * | 2/1988 | Droste et al. ................. 362/539 |
| 4,903,173 A * | 2/1990 | Mochizuki et al. ........... 362/544 |
| 5,353,204 A * | 10/1994 | Kawamura .................... 362/538 |
| 6,120,169 A * | 9/2000 | Sato .............................. 362/517 |
| 6,817,744 B2 * | 11/2004 | Tatsukawa .................... 362/544 |
| 6,953,273 B2 * | 10/2005 | Nakajima et al. ............. 362/517 |
| 7,217,020 B2 * | 5/2007 | Finch ............................ 362/544 |
| 7,572,041 B2 * | 8/2009 | Watanabe et al. ............. 362/509 |

FOREIGN PATENT DOCUMENTS

| DE | 199 07 765 A1 | 8/1999 |
| DE | 100 33 591 A1 | 2/2001 |
| DE | 10 2007 016 294 A1 | 10/2007 |
| JP | 2006-164909 A | 6/2006 |
| JP | 2006-236588 A | 9/2006 |

OTHER PUBLICATIONS

Extended European Search Report dated Mar. 1, 2011, in Application No. 09175477.0.

\* cited by examiner

*Primary Examiner* — Alan Cariaso
(74) *Attorney, Agent, or Firm* — Sughrue Mion, PLLC

(57) ABSTRACT

A vehicle headlamp is provided. The vehicle headlamp includes a lamp body having a front opening, a cover which covers the front opening of the lamp body to form a lamp housing, a first lamp unit which is disposed inside the lamp housing to produce at least one of a high beam and a low beam, and a second lamp unit disposed in a gap region between the lamp body and the first lamp unit to produce a beam other than the high beam and the low beam.

6 Claims, 4 Drawing Sheets

VEHICLE HEADLAMP

CROSS-REFERENCE TO RELATED APPLICATIONS

The present application claims priority from Japanese Patent Applications No. 2008-288880 filed on Nov. 11, 2008 and No. 2009-216052 filed on Sep. 17, 2009, the entire contents of which are incorporated herein by reference.

FIELD OF INVENTION

Apparatuses consistent with the present invention relate to a vehicle headlamp, particularly to a vehicle headlamp having a function of a daytime running lamp.

DESCRIPTION OF RELATED ART

A related art vehicle headlamp, which is sometimes called a combination headlamp, has a lamp housing, which is formed by a lamp body and a cover, and inside which an auxiliary illumination lamp (e.g., a fog lamp) and/or a signal lamp (e.g., a clearance lamp, a turn signal lamp, etc.) are incorporated with a primary illumination lamp (e.g., a high beam lamp and/or a low beam lamp). In recent years, moreover, a daytime running lamp is sometimes mounted inside the lamp housing of the vehicle headlamp. The daytime running lamp is turned on during the daytime to inform pedestrians and oncoming vehicles of the presence of the vehicle (see, e.g., JP 2006-164909 A).

However, in a case in which a plurality of lamps are provided in a lamp housing to irradiate different light distribution patterns, the vehicle headlamp becomes large.

BRIEF SUMMARY

Illustrative aspects of the present invention provide a compact vehicle headlamp having a plurality of lamps.

According to an illustrative aspect of the present invention, a vehicle headlamp includes a lamp body having a front opening, a cover which covers the front opening of the lamp body to form a lamp housing, a first lamp unit which is disposed inside the lamp housing to produce at least one of a high beam and a low beam, and a second lamp unit disposed in a gap region between the lamp body and the first lamp unit to produce a beam other than the high beam and the low beam.

Other aspects and advantages of the invention will be apparent from the following description, the drawings and the claims.

DETAILED DESCRIPTION

Hereinafter, an exemplary embodiment of the present invention will be described in detail with reference to the drawings.

Figure 1:
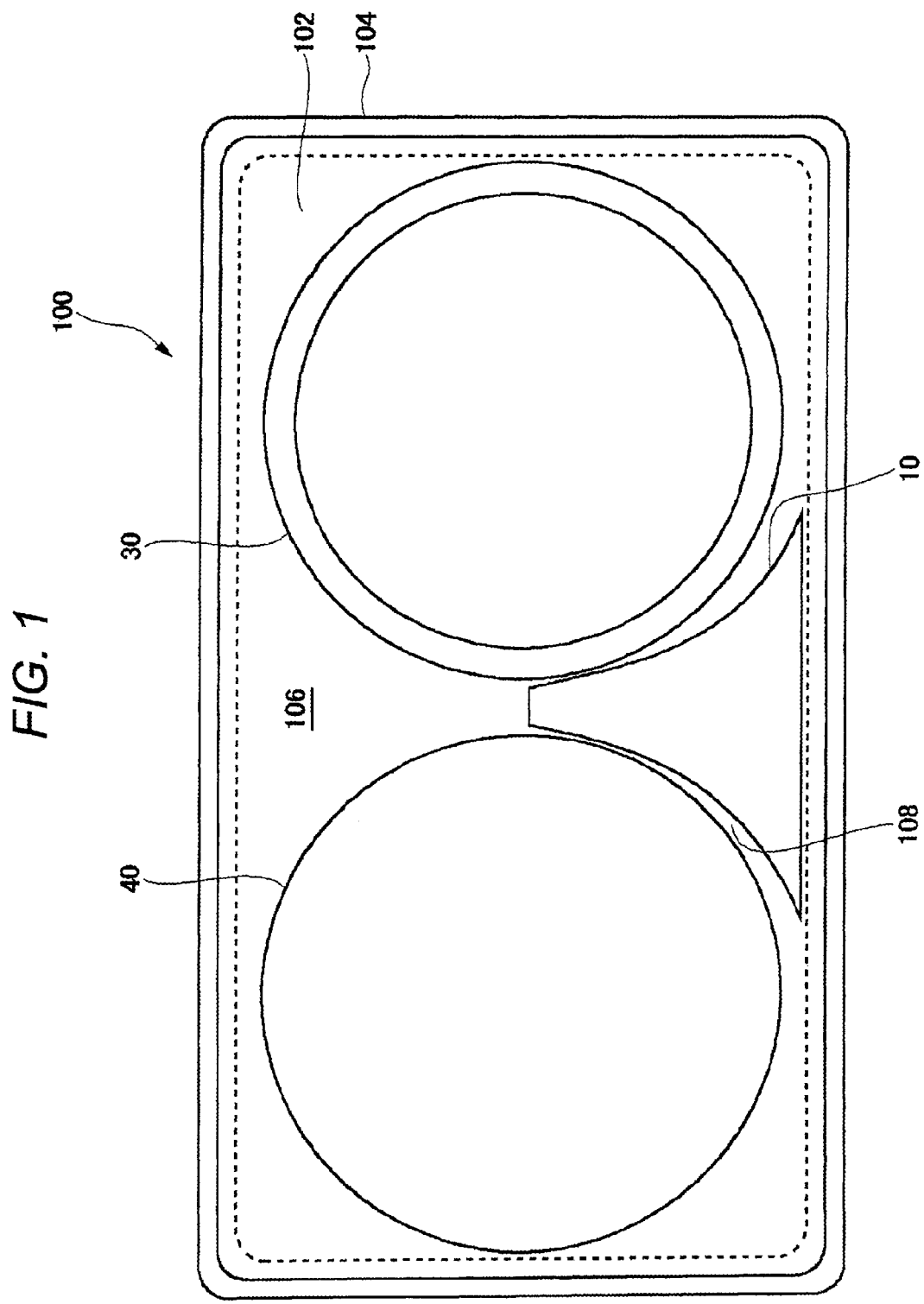
FIG. 1 is a front view of a vehicle headlamp according to an exemplary embodiment of the present invention.

FIG. 1 is a front view of a vehicle headlamp 100 according to the exemplary embodiment of the present invention. The vehicle headlamp 100 has a lamp body 104 having a front opening and a transparent cover 102, which covers the front opening of the lamp body 104. The lamp body 104 and the cover 102 form a lamp housing 106. The vehicle headlamp 100 further has a low beam lamp 30 (a first lamp unit), a high beam lamp 40 (another first lamp unit), and a daytime running lamp 10 (a second lamp unit), which are disposed inside the lamp housing 106.

As shown in FIG. 1, the low beam lamp 30 and the high beam lamp 40 are arranged side-by-side in the lamp housing 106. The low beam lamp 30 is turned on when, for example, driving in a city area during the nighttime. A configuration of the low beam lamp 30 is not particularly limited. For example, the low beam lamp 30 may be a projector-type, which reflects light by a reflector and forwardly projects the light through a projection lens, or the low beam lamp 30 may be a direct-lighting-type, which directly sends forth light emitted from a light source. The high beam lamp 40 is turned on when, for example, driving on a general road during the nighttime. A configuration of the high beam lamp 40 is not particularly limited. Since various configurations of the low beam lamp and the high beam lamp are well known in the art, a detailed description thereof will be omitted herein.

The daytime running lamp 10 is turned on during the daytime to inform pedestrians and oncoming vehicles of the presence of the vehicle. The daytime running lamp 10 is disposed in a gap region 108 surrounded by a lower wall of the lamp body 104, the low beam lamp 30, and the running beam lamp 40. The "gap region" herein implies a special region between the lamp body 104 and a lamp 30, 40 which produces at least one of the high beam and the low beam. In related art vehicle headlamps, the gap region is a region where an extension is formed to improve a front appearance of the headlamp.

According to the exemplary embodiment, in a front view shown in FIG. 1, an outline of each of the low beam lamp 30 and the high beam lamp 40 is circular, and the lamp body 104 is rectangular. Therefore, the gap region 108 surrounded by the low beam lamp 30, the high beam lamp 40, and the lower wall of the lamp body 104 is triangular in the front view.

The daytime running lamp 10 is configured to have a triangular shape in the front view so as to fit in the gap region 108 and to fill in the gap region 108.

As described above, the daytime running lamp 10 is disposed in the gap region 108, where an extension would otherwise be arranged. That is, it is not necessary to provide any additional space for the daytime running lamp. Thus, it is possible to reduce the size of the vehicle headlamp 100. The gap region 108 in which the daytime running lamp 10 is disposed is not necessarily a region surrounded by the low beam lamp 30, the high beam lamp 40, and the lower wall of the lamp body 104. For example, the daytime running lamp 10 may be disposed in a gap region between a left wall of the lamp body 104 and the low beam lamp 30, or in a gap region between a right wall of the lamp body 104 and the high beam lamp 40, etc. (see FIG. 1).

Figure 2:
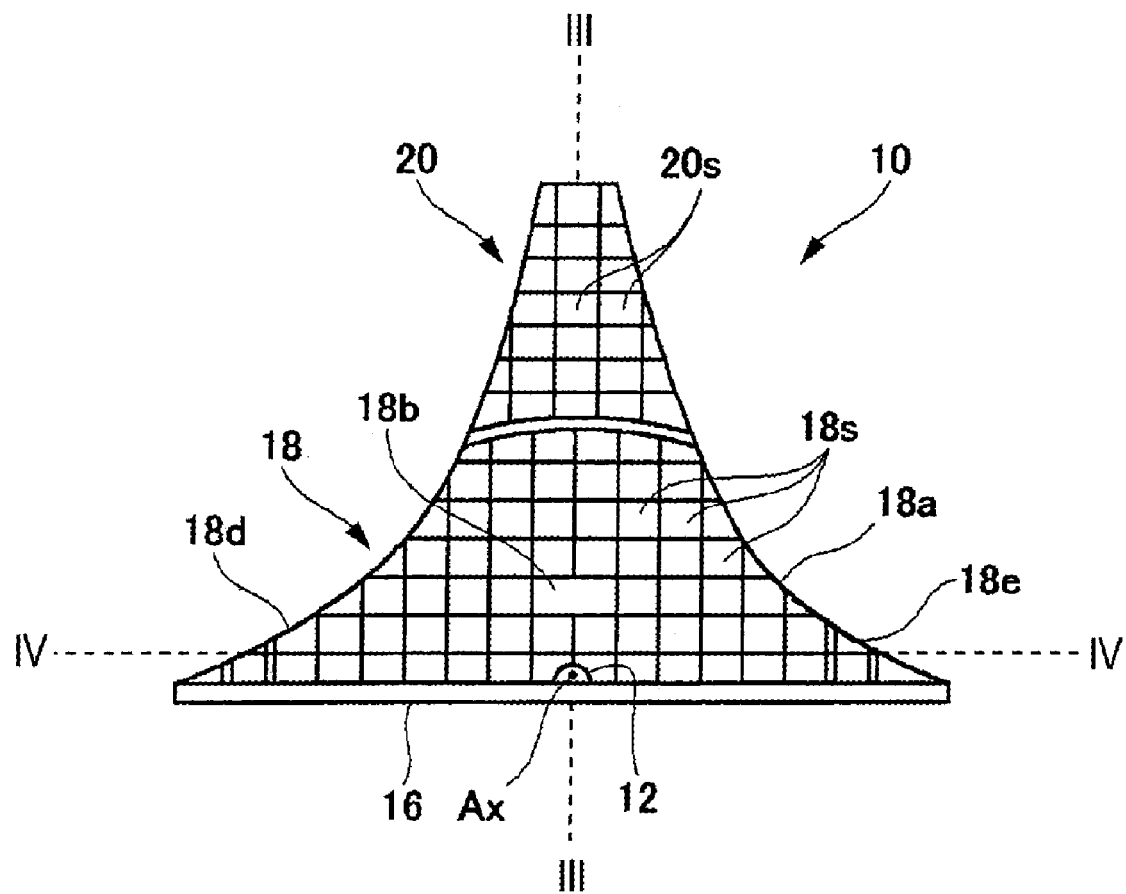
FIG. 2 is a front view of a daytime running lamp.
Figure 3:
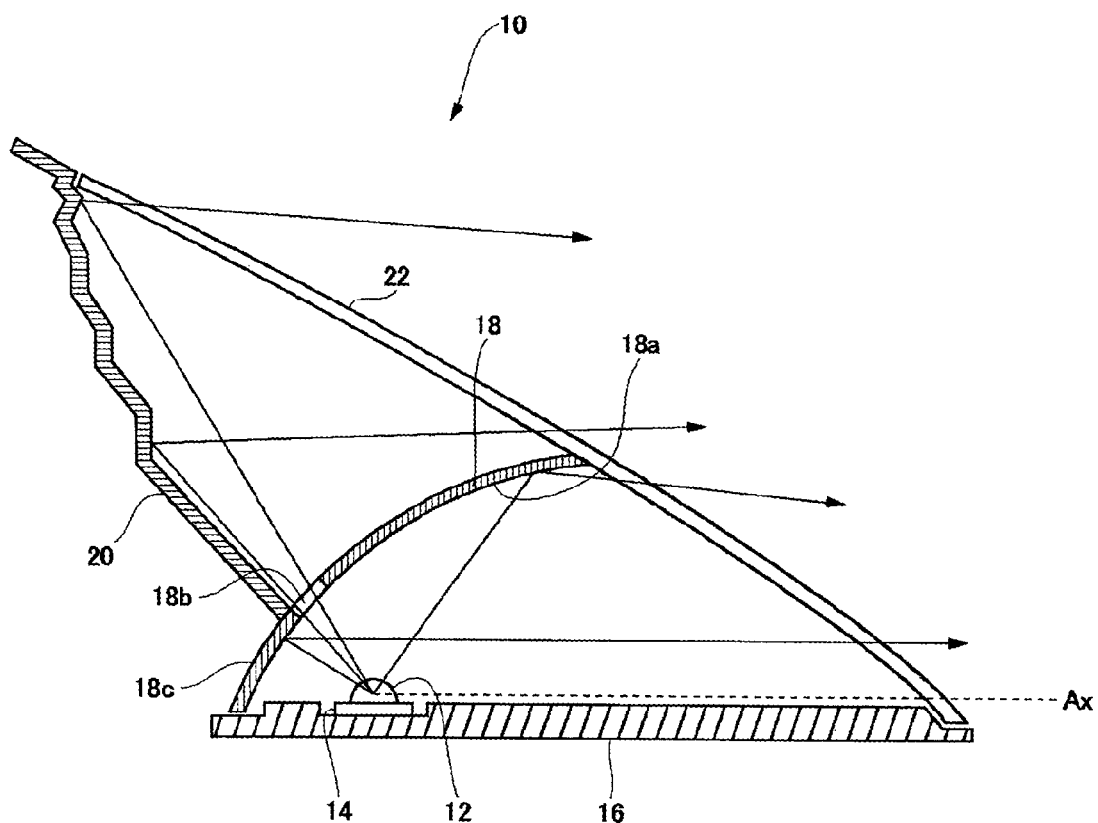
FIG. 3 is a sectional view of the daytime running lamp taken along the line III-III of FIG. 2.

FIG. 2 is a front view of the daytime running lamp 10. FIG. 3 is a sectional view of the daytime running lamp 10 taken along the line III-III of FIG. 2.

As shown in FIGS. 2 and 3, the daytime running lamp 10 has a light source 12, a substrate 14, a support member 16, a main reflector 18, an auxiliary reflector 20, and an inner lens 22.

The light source 12 according to the exemplary embodiment is a semiconductor light emitting device such as a light emitting diode (LED), and is arranged on the substrate 14 such that a direction in which light is emitted from the light source 12 is upwardly oriented so as to be perpendicular to an optical axis Ax of the daytime running lamp 10 and such that a light emitting point (or a light emitting face) is positioned on the optical axis Ax. In the front view, as shown in FIG. 2, the light source 12 is disposed at a central location on the base of the triangular shape of the daytime running lamp 10.

The substrate 14 is formed of a material, e.g., a ceramic material, having a high thermal conductivity, and is formed with a wiring pattern for supplying electricity to the light source 12. The substrate 14 is provided on the support member 16, which is formed in a flat plate-like shape. The support member 16 functions as a heat sink for dissipating heat that is generated by the light source 12.

The main reflector 18 forwardly reflects the light emitted from the light source 12 toward the inner lens 22 to send forth the light in a certain irradiation direction. The main reflector 18 is configured and arranged so as to surround the light source 12 from the rear, the sides and the top. A surface of the main reflector on a side facing the light source 12 has a reflecting surface 18a. At least a portion of the reflecting surface 18a is formed in a spheroidal shape having a focal point at the location of the light source 12. The reflecting surface 18a has a plurality of diffusion steps 18s arranged in a grid-like pattern. Each of the diffusion steps 18s is either a convex step or a concave step. The plurality of diffusion steps 18s is configured and arranged such that the light emitted from the light source 12 is diffused to form a light distribution pattern that is required for the daytime running lamp 10. The main reflector 18 is fixed and secured to the support member 16 at its lower end portion.

As shown in FIG. 1, because the daytime running lamp 10 is disposed to fit in the gap region 108, the main reflector 18 is configured to have a shape that extends along the outlines of the low beam lamp 30 and the high beam lamp 40 which are arranged on respective sides thereof. More specifically, in the front view, the main reflector 18 has a shape with right and left side portions cut to be in a concave arc shape.

As shown in FIGS. 2 and 3, an aperture 18b is formed through the main reflector 18 to allow a part of the light emitted from the light source 12 to pass through the aperture 18b toward the auxiliary reflector 20. According to the exemplary embodiment, the aperture 18b is provided rearwardly and obliquely above the light source 12, and is formed in the spheroidal portion of the reflecting surface 18a of the main reflector 18. The size and the shape of the aperture 18b may suitably be designed in accordance with a configuration of the auxiliary reflector 20 and the light amount to be reflected by the auxiliary reflector 20.

The auxiliary reflector 20 forwardly reflects the part of the light from the light source 12, which has passed through the aperture 18b. The auxiliary reflector 20 is provided to extend upwardly from a circumferential portion of the aperture 18b on a rear surface 18c of the main reflector 18 in a rearwardly oblique direction. According to the exemplary embodiment, the auxiliary reflector 20 is provided to extend, in the front view, and in relation to the triangular shape of the daytime running lamp 10, toward a vertex portion opposite the base on which the light source 12 is disposed. According to this configuration of the auxiliary reflector 20, the daytime running lamp 10 can be configured to fit into the shape of the gap region 108.

As shown in FIG. 3, the auxiliary reflector 20 is formed to have a stepwise configuration which extends upwardly in the rearward oblique direction in a stepped fashion, and in which reflecting surfaces and non-reflecting surfaces are alternately arranged. This stepwise configuration of the auxiliary reflector 20 is advantageous in that a length of the daytime running lamp 10 in a depth direction (i.e., in a front-and-rear direction of the vehicle headlamp 100) can be reduced as compared with a non-stepwise configuration. Each of the reflecting surfaces of the auxiliary reflector 20 has convex or concave diffusion steps 20s. The diffusion steps 20s are configured such that the light that has passed through the aperture 18b is diffused to form, together with the light forwardly reflected by the main reflector 18, the light distribution pattern that is required for the daytime running lamp 10.

The inner lens 22 is arranged in front of the main reflector 18 and the auxiliary reflector 20. The inner lens 22 has lens steps (not shown) which further diffuse the light reflected from the main reflector 18 and the auxiliary reflector 20.

Standards of a luminous intensity and a luminous area of the daytime running lamp are defined by regulations in each country. For example, according to one of the regulations, the luminous intensity at a point H-V on a virtual vertical screen disposed at a position 25 m ahead of a vehicle is defined as not less than 400 cd, and the effective luminous area (the area of the apparent surface) in the front view is defined as not less than 25 cm$^2$ and not more than 200 cm$^2$. Accordingly, the daytime running lamp 10 is configured such that an amount of light forwardly reflected from the main reflector 18 is more than the standard amount of light, and such that the total luminous area of the main reflector 18 and the auxiliary reflector 20 is within the range of the standard area. That is, the luminous intensity not less than the standard value under the regulation is obtained by the main reflector 18, which is capable of easily obtaining high luminous intensity, and the luminous area within the range of the standard area is obtained by using the auxiliary reflector 20, the area of which is easily adjustable in accordance with the shape of the gap region 108. Thus, according to the daytime running lamp 10 of the exemplary embodiment, the daytime running lamp 10 can be configured so as to comply with various regulations in each country.

Further, in order to obtain a larger luminous area with a single reflector, the size of the reflector needs to be increased, which results in an increase of the entire size of the vehicle headlamp 100. However, in the exemplary embodiment, the auxiliary reflector 20 is provided in addition to the main reflector 18. Therefore, it is possible to obtain a sufficient luminous area without enlarging the main reflector 18, whereby a compact vehicle headlamp 100 can be provided.

Moreover, in the exemplary embodiment, although the aperture 18b is formed in the main reflector 18, the auxiliary reflector 20 covers the region behind the aperture 18b as shown in FIG. 3. Therefore, when the daytime running lamp 10 is viewed from the front, the internal structure (e.g., a substrate, a wiring, etc.) inside the lamp housing 106 is not visible through the aperture 18b. Consequently, it is possible to configure the daytime running lamp 10 without impairing the appearance.

Figure 4:
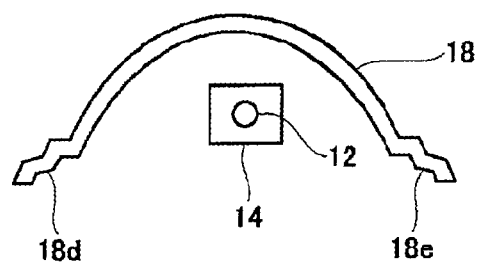
FIG. 4 is another sectional view of the daytime running lamp taken along the line IV-IV of FIG. 2.

FIG. 4 is a sectional view of the daytime running lamp 10 taken along the line Iv-Iv of FIG. 2. As shown in FIG. 4, the main reflector 18 has multi-stepwise reflectors 18d, 18e on respective sides. In the front view, the multi-stepwise reflectors 18d, 18e are provided at respective end portions of the base of the triangular shape as shown in FIG. 2. By providing the multi-tier reflectors 18d, 18e in this manner, it is possible to enlarge the luminous area of the daytime running lamp 10.

Figure 5:
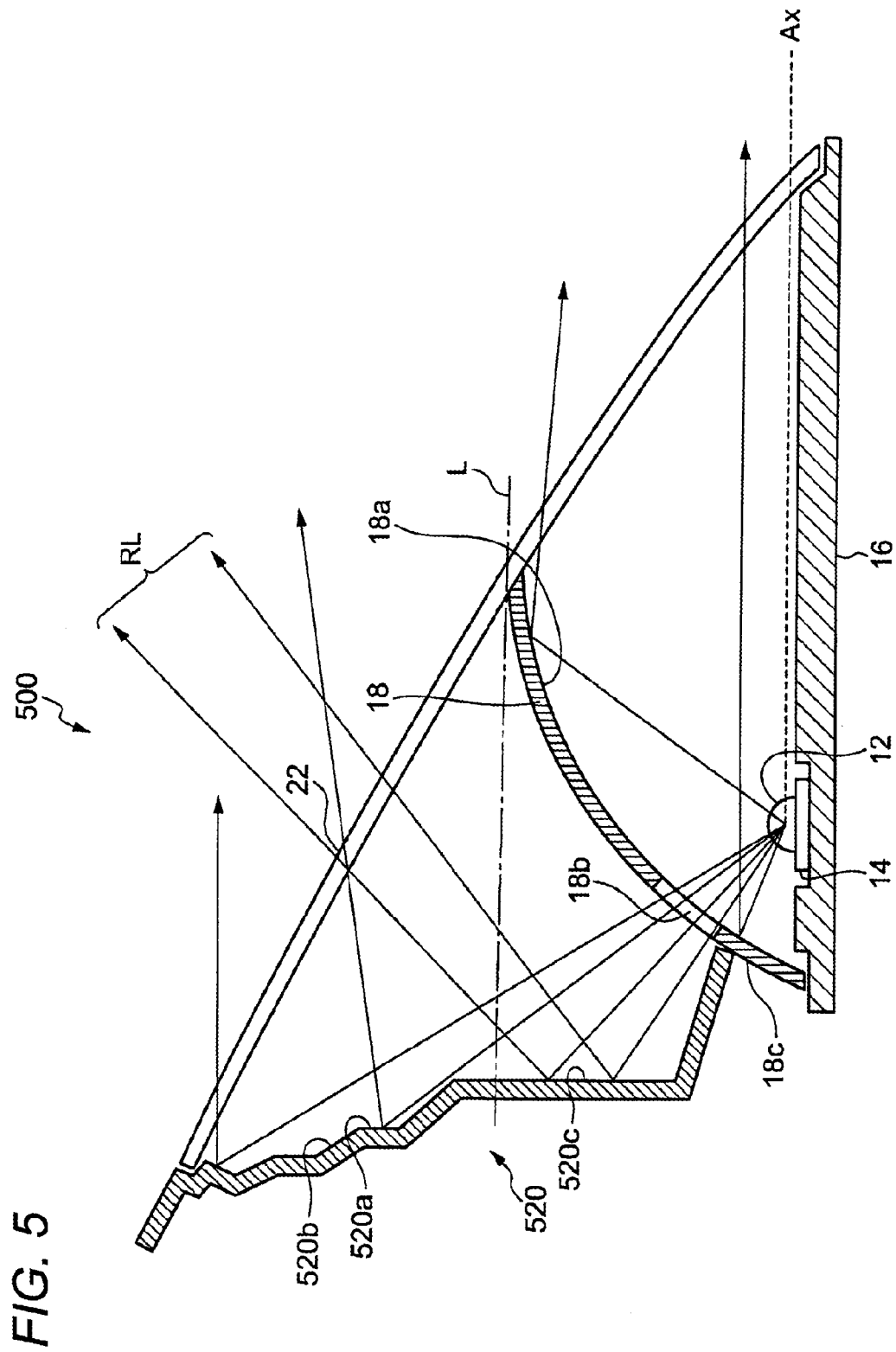
FIG. 5 is a sectional view of a modified example of the daytime running lamp.

FIG. 5 is a vertical sectional view of a daytime running lamp 500 according to a modified example of the exemplary embodiment described above. In the following description of the modified example, the elements, which are the same or correspond to those of the daytime running lamp 10 of FIG. 3, are denoted using the same reference numerals, and overlapping description thereof will be omitted. The daytime running lamp 500 of FIG. 4 is different from the daytime running lamp 10 of FIG. 3 in that a configuration of an auxiliary reflector 520 of the daytime running lamp 500 differs from the auxiliary reflector 20.

Like the auxiliary reflector 20 of FIG. 3, the auxiliary reflector 520 of FIG. 5 also upwardly extends in a rearwardly oblique direction from a circumferential portion of the aperture 18*b* on the rear surface 18*c* of the main reflector 18. Further, the auxiliary reflector 520 is provided to extend, in the front view, and in relation to the triangular shape of the daytime running lamp 500, toward a vertex portion opposite the base on which the light source 12 is disposed.

According to the modified example, the auxiliary reflector 520 has reflecting surfaces 520*a* and non-reflecting surfaces 520*b* which are arranged in a stepwise manner in a region above the height L of the upper end of the main reflector 18, and another reflecting surface 520*c* which extends substantially in a vertical direction in a region below the height L of the upper end of the main reflector 18. This reflecting surface 520*c* below the height L of the upper end of the main reflector 18 forwardly reflects a part RL of the light that has passed through the aperture 18*b* from the light source 12 in an upwardly oblique direction.

When the daytime running lamp 10 of FIG. 3 is viewed from the front and obliquely from above, the region below the height L of the upper end of the main reflector 18 becomes dark because a portion of the auxiliary reflector 20 below the height L of the upper end of the main reflector 18 does not reflect light. To the contrary, because the auxiliary reflector 520 of the modified example has the reflecting surface 520*c* below the height L of the upper end of the main reflector 18 to forwardly reflect the part RL of the light in the upwardly oblique direction, the region below the height L of the upper end of the main reflector 18 is prevented from becoming dark even when the daytime running lamp 500 is viewed from the front and obliquely from above. Accordingly, it is possible to improve the evenness of the light irradiation from the daytime running lamp 500, which in turn improves the appearance of the daytime running lamp 500.

The daytime running lamp 500 is different from the daytime running lamp 10 of FIG. 3 only in that the vertically extending reflecting surface 520*a* is provided. Therefore, the length of the daytime running lamp 500 in the front-and-rear direction of the headlamp 100 is not different from the corresponding length of the daytime running lamp 10.

The reflecting surface 520*a* of the auxiliary reflector 520 may have a plurality of convex and/or concave diffuse steps to form a light distribution pattern that is required for the daytime running lamp 500.

While the present invention has been described with reference to a certain exemplary embodiment and a modification thereof, it will be understood by those skilled in the art that various changes and other modifications may be made therein without departing from the spirit and scope of the present invention as defined by the appended claims.

For example, the lamp (the second lamp unit) to be arranged in the gap region 108 may not necessarily be the daytime running lamp 10, 500, and may be other types of lamps such as a fog lamp or a turn signal lamp. Even in those cases, it is possible to reduce the size of the vehicle headlamp 100.

Further, the light source 12 may not necessarily be the LED, and may be other types of semiconductor light emitting device or a lamp bulb.

Furthermore, the low beam lamp 30 and the high beam lamp 40 may not necessarily be provided as separate lamp units. That is, a single lamp unit capable of producing the low beam and the high beam may alternatively be provided. In this case, the daytime running lamp 10, 500 is provided in the gap region between the single lamp unit and the lamp body 104.

Furthermore, the daytime running lamp 10, 500 may not necessarily have a triangular shape in the front view, and may have other shapes that match the shape of the gap region 108.

Furthermore, the reflecting surfaces 18*a* of the main reflector 18 and the reflecting surfaces of the auxiliary reflector 20, 520 may not necessarily have the diffusion steps. For example, the inner lens 22 may be configured to have a fish-eye lens or lenses to diffuse the light without providing the diffusion steps on the main reflector 18 and the auxiliary reflector 20, 520. Alternatively, the main reflector 18 and the auxiliary reflector 20, 520 may be configured to have diffusion steps that diffuse light in right and left directions and the inner lens 22 may be configured to have diffusion steps that diffuse the light in up and down directions, or the main reflector 18 and the auxiliary reflector 20, 520 may be configured to have diffusion steps that diffuse light in the up and down directions and the inner lens 22 may be configured to have diffusion steps that diffuse the light in the right and left directions.

What is claimed is:

1. A vehicle headlamp comprising: a lamp body having a front opening; a cover, which covers the front opening of the lamp body to form a lamp housing; a first lamp unit which is disposed inside the lamp housing to produce a high beam; a second lamp unit; and a third lamp unit which is disposed inside the lamp housing to produce a low beam; the second lamp unit being disposed in a gap region between the lamp body, the first lamp unit, and the third lamp unit to produce a beam other than the high beam and the low beam; wherein, in a front view, an outline of the second lamp unit conforms to a shape of the gap region defined by a wall of the lamp body, an outline of the first lamp unit and an outline of the third lamp unit; wherein in the front view, the outline of the first lamp unit comprises a convex arc, the outline of the third lamp unit comprises a convex arc, and the outline of the second lamp unit comprises concave arcs that conform to the convex arcs of the first lamp unit and of the third lamp unit, respectively.

2. A vehicle headlamp comprising:
a lamp body having a front opening;
a cover, which covers the front opening of the lamp body to form a lamp housing;
a first lamp unit which is disposed inside the lamp housing to produce at least one of a high beam and a low beam; and
a second lamp unit disposed in a gap region between the lamp body and the first lamp unit to produce a beam other than the high beam and the low beam;
wherein the second lamp unit comprises:
a light source;
a main reflector which reflects a primary part of light emitted from the light source, wherein an aperture is formed through the main reflector;
an auxiliary reflector which extends from a circumferential portion of the aperture on the main reflector to reflect a second part of the light emitted from the light source, which has passed through the aperture.

3. The vehicle headlamp according to claim 2, wherein the auxiliary reflector comprises a reflecting surface which is disposed below a height of an upper end of the main reflector to forwardly reflect the second part of the
light in an upwardly oblique direction.

4. The vehicle headlamp according to claim 2, wherein the second lamp unit is configured such that the primary part of the light reflected by the main reflector satisfies a light amount standard required by a regulation related to the second lamp unit, and such that a total luminous area of the main reflector and the auxiliary reflector satisfies a standard range of luminous area required by said regulation.

5. The vehicle headlamp according to claim 2, wherein the second lamp unit has a triangular shape in a front view, wherein the light source is disposed at a central location on one side of the triangular shape, wherein the main reflector comprises a reflecting surface having a spheroidal part, a focal point of which is at the light source, and the aperture is formed through the spheroidal part, and wherein the auxiliary reflector extends, in the front view, and in relation to the triangular shape of the second lamp unit, toward a vertex portion opposite the side on which the light source is disposed.

6. The vehicle headlamp according to claim 5, wherein the main reflector comprises multi-stepwise reflectors provided at respective end portions of said side of the triangular shape.

* * * * *